(12) United States Patent
Keren

(10) Patent No.: US 7,775,237 B2
(45) Date of Patent: Aug. 17, 2010

(54) FLUID FLOW CONTROL REGULATOR

(75) Inventor: Ron Keren, Hanegev (IL)

(73) Assignee: Netafim, Ltd., Tel Aviv (IL)

( * ) Notice: Subject to any disclaimer, the term of this patent is extended or adjusted under 35 U.S.C. 154(b) by 130 days.

(21) Appl. No.: 12/158,691

(22) PCT Filed: Dec. 27, 2005

(86) PCT No.: PCT/IL2005/001382

§ 371 (c)(1),
(2), (4) Date: Jun. 22, 2008

(87) PCT Pub. No.: WO2007/074428

PCT Pub. Date: Jul. 5, 2007

(65) Prior Publication Data

US 2008/0265064 A1    Oct. 30, 2008

(51) Int. Cl.
*B05B 1/30* (2006.01)
*G05D 7/01* (2006.01)
(52) U.S. Cl. ............... 137/488; 137/501; 239/533.1; 138/43
(58) Field of Classification Search ............... 137/488, 137/489, 497, 501; 138/43; 239/533.1
See application file for complete search history.

(56) References Cited

U.S. PATENT DOCUMENTS

| | | | |
|---|---|---|---|
| 2,762,397 A | | 9/1956 | Miller |
| 2,816,572 A | * | 12/1957 | Pratt ........................... 137/501 |
| 2,989,086 A | * | 6/1961 | Dahl ........................... 138/43 |
| 4,196,753 A | * | 4/1980 | Hammarstedt ............... 138/43 |
| 4,253,491 A | | 3/1981 | Worthen et al. |
| 4,527,595 A | * | 7/1985 | Jorgensen et al. ............. 138/43 |
| 4,796,810 A | * | 1/1989 | Zakai ..................... 239/222.17 |
| 5,101,854 A | * | 4/1992 | Bron ........................... 137/501 |
| 5,279,462 A | | 1/1994 | Mehoudar |
| 5,988,211 A | * | 11/1999 | Cornell ........................ 137/504 |

OTHER PUBLICATIONS

PCT/IL2005/001382 International Search Report, mailed Dec. 5, 2006.

* cited by examiner

*Primary Examiner*—Kevin L Lee
(74) *Attorney, Agent, or Firm*—Womble Carlyle

(57) ABSTRACT

A fluid flow regulator (20) comprising: a fluid inlet port (34) and a fluid outlet port (54); at least one open-faced flow control channel (60) defined by a planar bottom (62) and two sidewalls (64) that communicates with the outlet port (54) at a junction (66) and has a cross-section that decreases with distance from the junction; an elastic diaphragm (40); a support shelf (58) on which the diaphragm (40) seats and which supports the diaphragm (40) along a planar contour parallel to the bottom of each of the at least one channel (60); wherein to regulate fluid flow, with increasing inlet fluid pressure the diaphragm (40) covers portions of the open face that are farther from the junction (66) in a region where the cross-section decreases with distance from the junction (66).

20 Claims, 5 Drawing Sheets

FLUID FLOW CONTROL REGULATOR

CROSS-REFERENCE TO RELATED APPLICATIONS

The present application is a US National Phase of PCT Application No. PCT/IL2005/001382, filed on Dec. 27, 2005, the disclosure of which is incorporated herein by reference.

FIELD OF THE INVENTION

The invention relates to regulators for controlling the flow of a fluid.

BACKGROUND OF THE INVENTION

Fluid flow regulators, particularly regulators used for controlling flow of water in irrigation systems, often control flow of water by controlling the resistance to flow of the water through at least one relatively small flow control channel. Relatively small water flow regulators used for irrigation applications typically provide regulated flow rates between about 10 and 100 liters per hour (l/h) and have components usually formed from plastics by injection molding.

The regulators generally comprise an inlet and an outlet through which water respectively enters and exits the regulator and an elastic diaphragm that prevents water that enters the inlet from flowing directly to the outlet. The inlet and outlet are usually located so that they face each other, with the diaphragm seated on a support shelf and located between them. The diaphragm constrains water that enters the regulator to pass through at least one flow control channel in order for the water to reach the outlet and flow out of the regulator. The diaphragm is responsive to pressure of the entering water, and as pressure of the inlet water increases, the diaphragm undergoes increasing distortion. The diaphragm and at least one flow control channel are configured so that as the distortion increases, the resistance to flow of the at least one flow channel increases substantially proportional to the inlet water pressure. As a result, an amount of water that passes through the regulator is substantially independent of changes in inlet water pressure.

Generally, the at least one flow control channel is an open-faced flow channel defined by a bottom and two sidewalls. Depth of the channel at any location along the channel's length is defined as the height of the sidewalls at the location. In operation, the diaphragm distorts with increasing inlet pressure to cover an increasing length, hereinafter "cover length", of the open face of the channel. The water is constrained to flow through the covered length of the channel to reach the outlet and as the cover length increases with inlet pressure, the channel resistance to flow of water increases.

In some regulators, as the diaphragm distorts with increasing inlet pressure, the diaphragm first covers the open face of a flow channel at a location, hereinafter a "junction", at which the channel communicates with the outlet. As the inlet pressure increases, the diaphragm distortion increases and covers the open face of the channel at progressively greater distances from the junction and at locations closer to the support shelf. The cover length of the channel extends from the junction and increases with increasing inlet pressure in a direction away from the outlet towards the support shelf.

However, as distortion of the regulator diaphragm approaches the support shelf, the rate of distortion of the diaphragm with increase in water inlet pressure departs from linearity and decreases with increasing inlet pressure. As a result, rate of increase of cover length of the open face of the at least one flow channel as a function of increase in inlet pressure generally decreases with increasing inlet pressure. If the channel has a uniform cross-section its flow resistance increases at a substantially constant rate with increase in cover length and the regulator must generally be made relatively large so that for a range of inlet pressures for which the regulator is used, flow resistance of the at least one channel increases substantially linearly with inlet pressure.

Smaller regulators have been made in which, as the diaphragm distorts with increasing inlet pressure, the diaphragm first covers the open face of a flow channel near the support shelf and as the inlet pressure increases, the diaphragm distorts to progressively cover regions of the open face of the channel closer to the junction and farther from the support shelf. The cover length of the channel extends from a region near the support shelf and increases with increasing inlet pressure in a direction towards the outlet and away from the support shelf rather than in a direction from the outlet towards the support shelf.

For these regulators, flow channels are configured so that at regions closer to the support shelf, the open face of the channel is closer to the diaphragm than at regions closer to the inlet and the channel is wider and shallower at regions closer to the support shelf than at regions closer to the outlet. The channel gets progressively wider and shallower at distances farther from the inlet and channel resistance to flow per unit length of channel increases with increasing distance, hereafter referred to as "channel distance", from the inlet. Decreasing channel depth with distance directly decreases cross-section with distance. Increasing channel width would appear to increase channel cross-section with channel distance. However, in operation, the increase in width generally contributes to decreasing channel cross-section with channel distance because at the wider portions of the channel, the diaphragm depresses a greater distance into the channel and "chokes" the cross-section more than at narrower portions of the channel.

Whereas configuring flow control channels with decreasing depth and increasing width enables flow regulators to be made smaller, the relationships between channel depth, width and diaphragm characteristics are relatively complicated and modifying injection molds used to produce the regulators to modify the flow rates they provide is often a tedious and relatively expensive job. Furthermore, because the channels get progressively narrower at distances closer to the junction, i.e. at smaller channel distances, the channels are prone to clogging with dirt and particulate debris carried by the water. In addition, at higher water inlet pressures the operation of the regulators in regulating water flow is relatively sensitive to variations in characteristics, for example elasticity and thickness, of the diaphragm.

U.S. Pat. No. 4,796,810, the disclosure of which is incorporated herein by reference, describes a rotary irrigation sprinkler comprising a flow control regulator having an elastic diaphragm for controlling flow rate. U.S. Pat. No. 5,279,462 the disclosure of which is incorporated herein by reference, describes a fluid flow control unit having injection molded plastic components that are configured to provide improved assembly using an ultrasonic welding process.

SUMMARY OF THE INVENTION

An aspect of some embodiments of the invention relates to providing a fluid flow regulator having an elastic diaphragm and improved configuration of at least one open-faced flow control channel. The improved configuration provides for improved regulation of fluid flow and enables injection molds used for producing the regulator to be relatively easily modified to change a regulated flow rate that the regulator provides.

According to an aspect of some embodiments of the invention, the regulator comprises a support shelf on which the diaphragm seats and which supports the diaphragm along a planar contour and at least one open-faced flow control channel having a channel cross-section that decreases with channel distance. The at least one flow control channel is defined by a planar bottom parallel to the planar contour and two sidewalls.

According to an aspect of some embodiments of the invention, the channel has a substantially uniform depth along its length and the sidewalls converge toward each other so that the channel narrows with channel distance and channel cross-section decreases with channel distance substantially only in proportion to the channel narrowing. A rate of increase in channel flow resistance as a function of channel cover length therefore increases with cover length and thereby with inlet pressure. The narrowing of the at least one channel, in accordance with an embodiment of the invention, compensates for the decrease in rate of increase of cover length with inlet pressure and moderates the dependence of output fluid flow provided by the regulator on inlet fluid pressure.

Optionally, the at least one flow channel comprises a plurality of flow channels and the bottoms of all of the flow channels are coplanar. In an embodiment of the invention, the rate at which the at least one channel narrows as a function of distance, i.e. channel distance along the channel from the junction, is matched to characteristics of the diaphragm and a pressure regime in which the regulator is intended to operate so that resistance to fluid flow is substantially proportional to fluid inlet pressure.

At any given point along the at least one channel, an angle between the sidewalls at which the sidewalls converge with channel distance is referred to as a "convergence angle". Optionally, width of the at least one channel as a function of channel distance is a linearly decreasing function of channel distance and the walls converge with a constant convergence angle. In some embodiments of the invention the convergence angle is an angle between about 10° and 50°.

The inventor has found that for some ranges of output flow rates typically used in irrigation applications, a regulated flow rate provided by a regulator in accordance with an embodiment of the invention may readily be adjusted by adjusting substantially only the depth of the regulator's flow control channels. Increasing the depth increases the output flow rate of the regulator and decreasing the depth decreases the output flow rate and an increase or decrease in channel depth does not substantially affect the regulating function of the regulator. In some instances for which a change in depth does compromise flow rate regulation, flow rate regulation can generally be satisfactorily improved by a relatively easily accomplished change in sidewall convergence angle.

Assuming the regulator flow channels are formed by injection molding, because the bottom of each of the at least one channel is planar and lies in a same plane parallel to the support shelf of the diaphragm, an injection mold used to provide the channels can often relatively easily be adjusted to adjust the channel depth. For example, in the injection molding process, the flow channels are formed by protrusions in an injection mold that are negative reliefs of the at least one channel. Assume that the regulator is formed with relatively deep flow control channels and provide a regulated output flow rate that is too large. The mold used to produce the regulator channels can relatively easily be modified to reduce the flow rate by milling off a desired amount of the flow channel protrusions so that the mold produces shallower flow control channels.

There is therefore provided, in accordance with an embodiment of the invention, a fluid flow regulator comprising: a fluid inlet port and a fluid outlet port; at least one open-faced flow control channel defined by a planar bottom and two sidewalls that communicates with the outlet port at a junction and has a cross-section that decreases with distance from the junction; an elastic diaphragm; a support shelf on which the diaphragm seats and which supports the diaphragm along a planar contour parallel to the bottom of each of the at least one channel; wherein to regulate fluid flow, with increasing inlet fluid pressure the diaphragm covers portions of the open face that are farther from the junction in a region where the cross-section decreases with distance from the junction.

Optionally, the at least one open-faced flow control channel comprises a plurality of channels. Optionally, the bottoms of at least two of the flow control channels are coplanar.

In some embodiments of the invention, the sidewalls converge toward each other with distance from the junction. Optionally, the sidewalls converge with distance along the at least one flow channel with a constant convergence angle.

In some embodiments of the invention, the sidewalls of different flow control channels of the at least one flow control channel converge at different constant convergence angles. In some embodiments of the invention, the sidewalls of different flow control channels of the at least one flow control channel converge at a same constant convergence angle.

In some embodiments of the invention, the sidewalls have a uniform height along the length of the at least one channel.

There is further provided, in accordance with an embodiment of the invention, a fluid flow regulator comprising: a fluid inlet port and a fluid outlet port; at least one open-faced flow control channel defined by a planar bottom and two sidewalls that communicates with the outlet port at a junction and has a cross-section that decreases with distance from the junction; an elastic diaphragm; a support shelf on which the diaphragm seats; wherein to regulate fluid flow, with increasing inlet fluid pressure the diaphragm covers portions of the open face that are farther from the junction in a region where the cross-section decreases with distance from the junction.

BRIEF DESCRIPTION OF FIGURES

Non-limiting examples of embodiments of the present invention are described below with reference to figures attached hereto, which are listed below following this paragraph. In the figures, identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION OF EXEMPLARY EMBODIMENTS

Figure 1A:
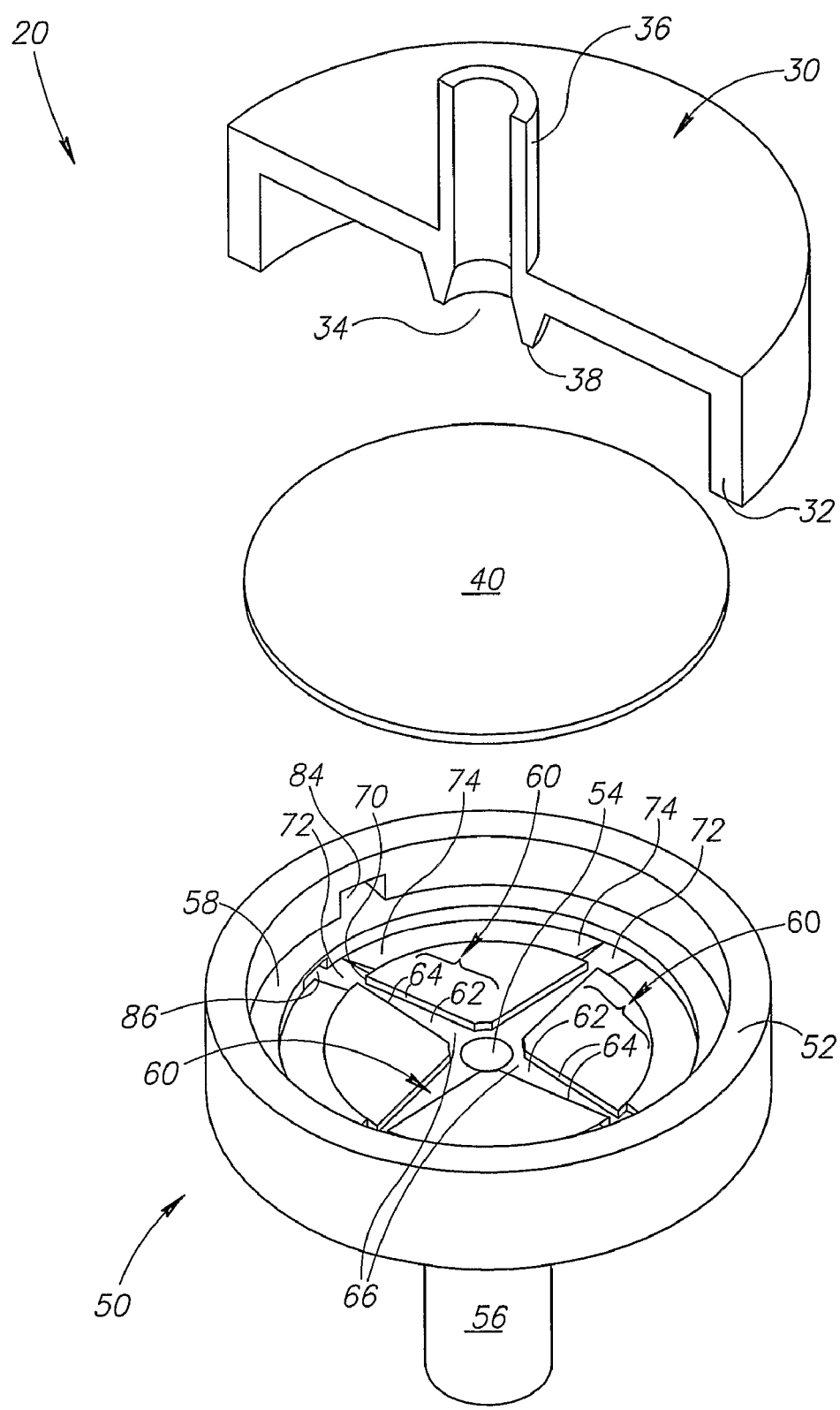
FIG. 1A schematically shows an exploded partially cutaway view of a fluid flow regulator, in accordance with an embodiment of the invention.
Figure 1B:
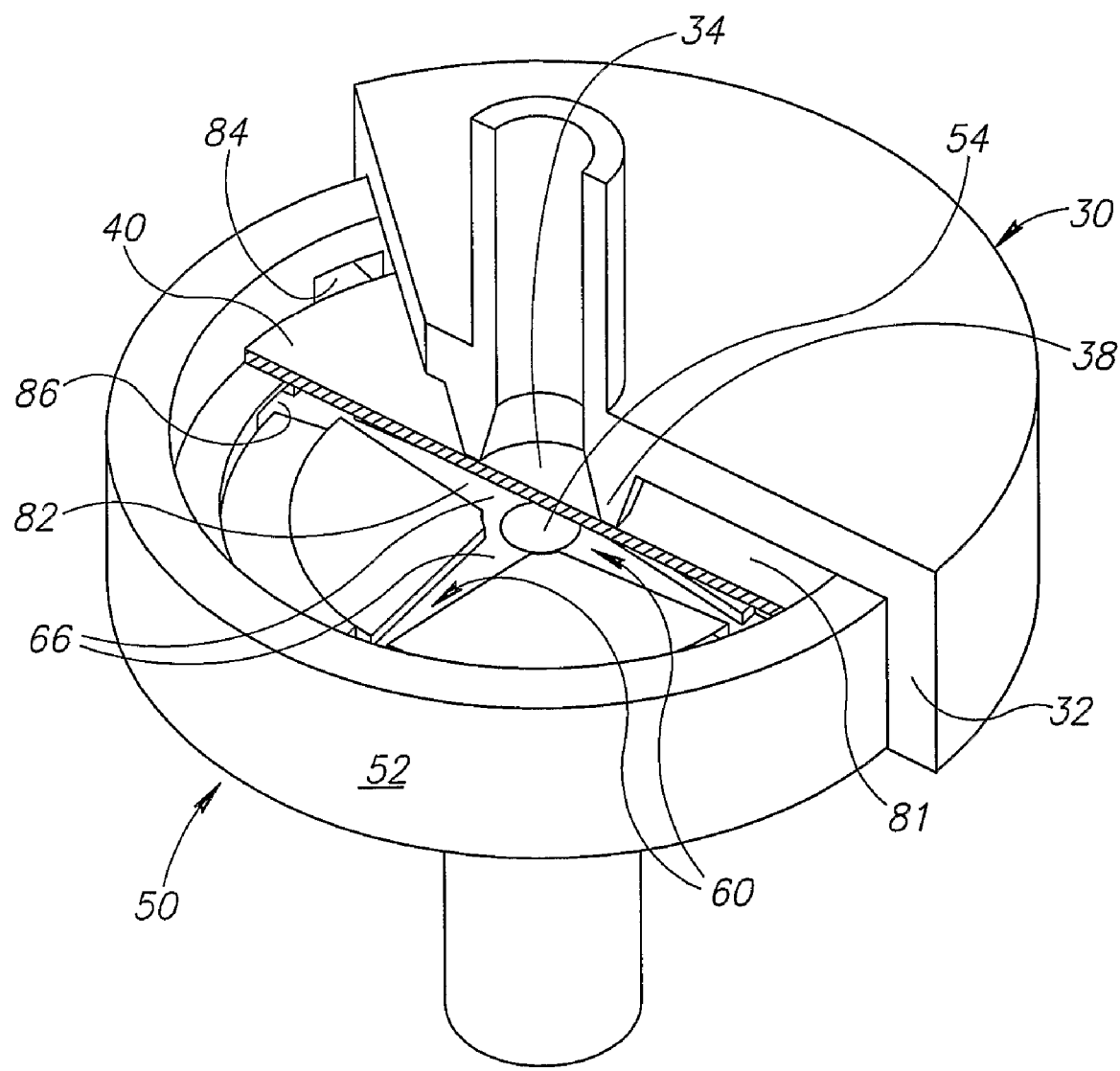
FIG. 1B schematically shows an assembled, partially cutaway view of the regulator shown in FIG. 1A, in accordance with an embodiment of the invention.

FIG. 1A schematically shows an exploded and partially cutaway view of a flow control regulator 20, in accordance with an embodiment of the invention. FIG. 1B schematically shows an assembled, partially cutaway, view of flow control regulator 20 shown in FIG. 1A. For convenience of presentation it is assumed that regulator 20 is used to control flow of water.

Regulator 20 optionally comprises an inlet cowling 30, a diaphragm 40 and an outlet cowling 50. Optionally, inlet cowling 30 is injection molded from a suitable plastic as an integral unit using any of various methods known in the art. Optionally, outlet cowling 50 is similarly formed by injection molding as a single integral unit.

Inlet cowling 30 optionally has a rim 32 and is formed with a regulator inlet port 34 and an input coupling tube 36 having any shape suitable for coupling the regulator to a source of water. An optionally annular diaphragm scaffold 38 is formed on an inside surface of inlet cowling 30 for maintaining position of diaphragm 40 when regulator 20 is assembled. Optionally, inlet cowling 30 is injection molded from a suitable plastic as an integral unit using any of various methods known in the art.

Outlet cowling 50 optionally has a rim 52 and is formed with a regulator outlet port 54 and an output coupling tube 56 having any shape suitable for coupling regulator 20 to a fluid flow system to which regulator 20 provides a regulated flow of water. The outlet cowling is formed with a planar diaphragm support shelf 58 that supports regulator diaphragm 40 and with at least one flow control channel 60. Each at least one flow control channel 60 communicates with outlet port 54 at a junction 66 and is an open-faced channel defined by a bottom 62 and two sidewalls 64. Opposite junction 66 at an end 70 of each at least one flow channel 60, the channel optionally connects with a channel inlet 72 formed in an optionally sloped apron 74 optionally surrounding the region in which the at least one flow channel is formed. Sloped apron 74 functions as a manifold for channel inlets 72 and the manifold and inlets operate to guide water into at least one channel 60. Optionally, the at least one flow control channel comprises a plurality of flow channels, and by way of example, regulator 20 is shown comprising four flow channels 60. Optionally, the flow channels are configured symmetrically about outlet port 54.

In accordance with an embodiment of the invention, bottom 62 of each at least one flow control channel 60 is flat and lies in a plane that is parallel to the plane of support shelf 58. Optionally, sidewalls 64 of a given flow control channel 60 are mirror images of each other and are optionally substantially perpendicular to bottom 62. In accordance with an embodiment of the invention, sidewalls 64 of the given flow channel 60 have a same uniform height along channel 60 relative to bottom 62 of the flow channel and a separation distance between the sidewalls, i.e. the width of the given flow channel, decreases with distance, i.e. channel distance, along the channel from junction 66. As a result, the channel has a cross-sectional area that varies with distance from junction 66 substantially only as a function of the sidewall separation and decreases with distance along the channel from the junction. Optionally, flow channel width is a linearly decreasing function of channel distance.

As shown in the assembled view of regulator 20 in FIG. 1B, inlet and outlet cowlings 30 and 50 are joined together to form an internal flow volume with diaphragm 40 positioned by scaffold 38 so that it rests on support shelf 58. Diaphragm 40 prevents water that enters inlet port 34 from flowing directly to outlet port 54 and divides the internal flow volume into an inlet chamber 81 on one side of the diaphragm that communicates with inlet port 34 and an output chamber 82 on the other side of the diaphragm that communicates with outlet port 54.

Water that enters regulator 20 through inlet port 34 accumulates in inlet chamber 81 and flows therefrom, optionally via an inlet chamber exit port 84, through a "detour channel" (not shown) to enter and accumulate in outlet chamber 82 via an entrance port 86. The detour channel is optionally defined by structure in the outer surface of rim 52 of outlet cowling 50 and the inner surface of rim 32 of inlet cowling 30. Pressure in inlet and outlet chambers 81 and 82 is not the same, pressure in the inlet chamber being greater than pressure in the outlet chamber. The "overpressure" in inlet chamber 81 distorts diaphragm 40 so that it depresses to cover at least a portion of the open face of at least one channel 60. The portion of the open face of the at least one channel 60 that is covered by the diaphragm extends from junction 66 to a location along the channel at a distance from the junction that is a function of the overpressure. As the pressure of the inlet water increases, the overpressure in inlet chamber 81 increases, the distortion of diaphragm 40 increases and the diaphragm depresses to cover a greater length, i.e. "cover length", of the open face of the at least one channel.

To flow out of regulator 20, the water in the outlet chamber must flow through the covered portion of at least one output channel 60 to reach outlet port 54. Since the cover length of the channel increases with inlet pressure, resistance to fluid flow of the at least one channel increases and moderates dependence of the flow of water out of the regulator on inlet pressure. The increase in channel flow resistance with increase in cover length is a result of both the increase in the length of the channel through which water must flow to exit regulator 20 and because, in accordance with an embodiment of the invention, additions to the covered portion of the channel with increase in cover length generally have progressively decreasing cross-sections.

Figure 2A:
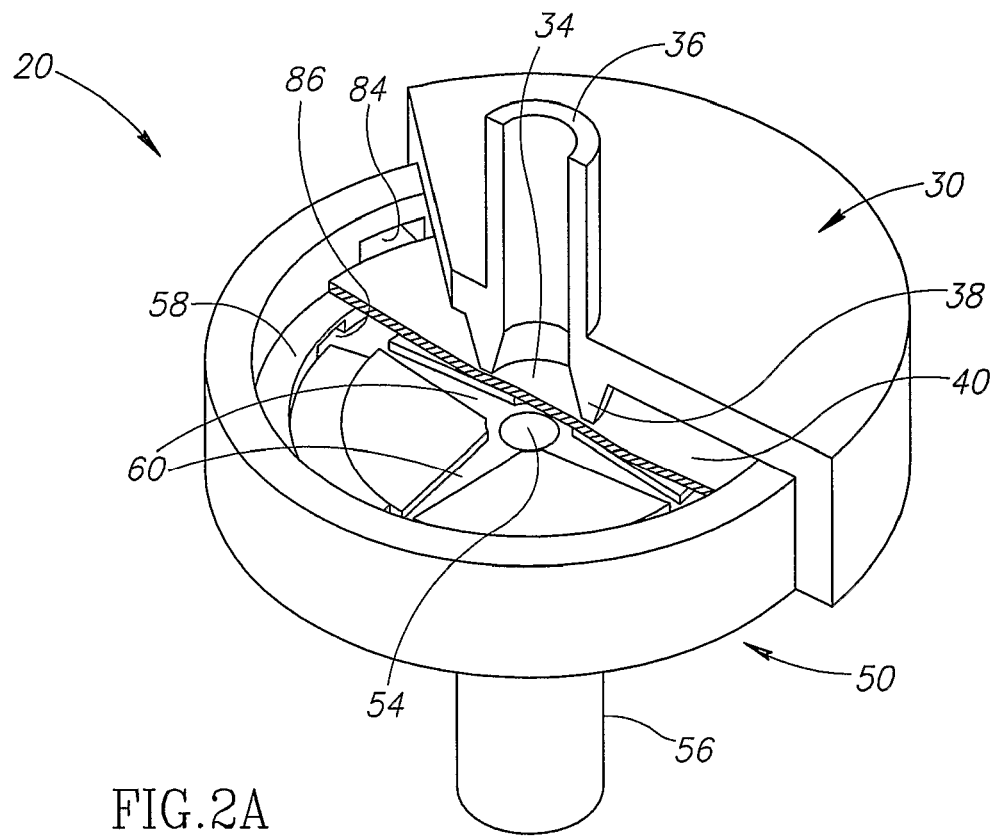
FIGS. 2A and 2B show schematic perspective and cross-sectional cutaway views respectively of the regulator shown in FIGS. 1A and 1B that illustrate distortion of a diaphragm in the regulator at a relatively low pressure, in accordance with an embodiment of the invention.
Figure 2B:
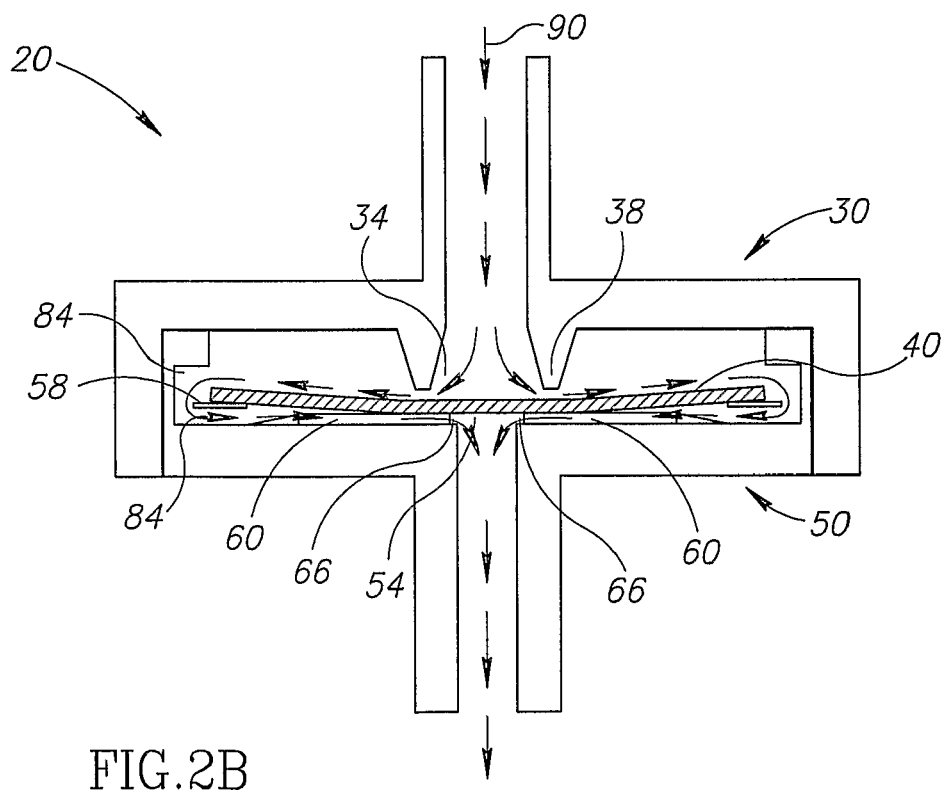
Figure 2C:
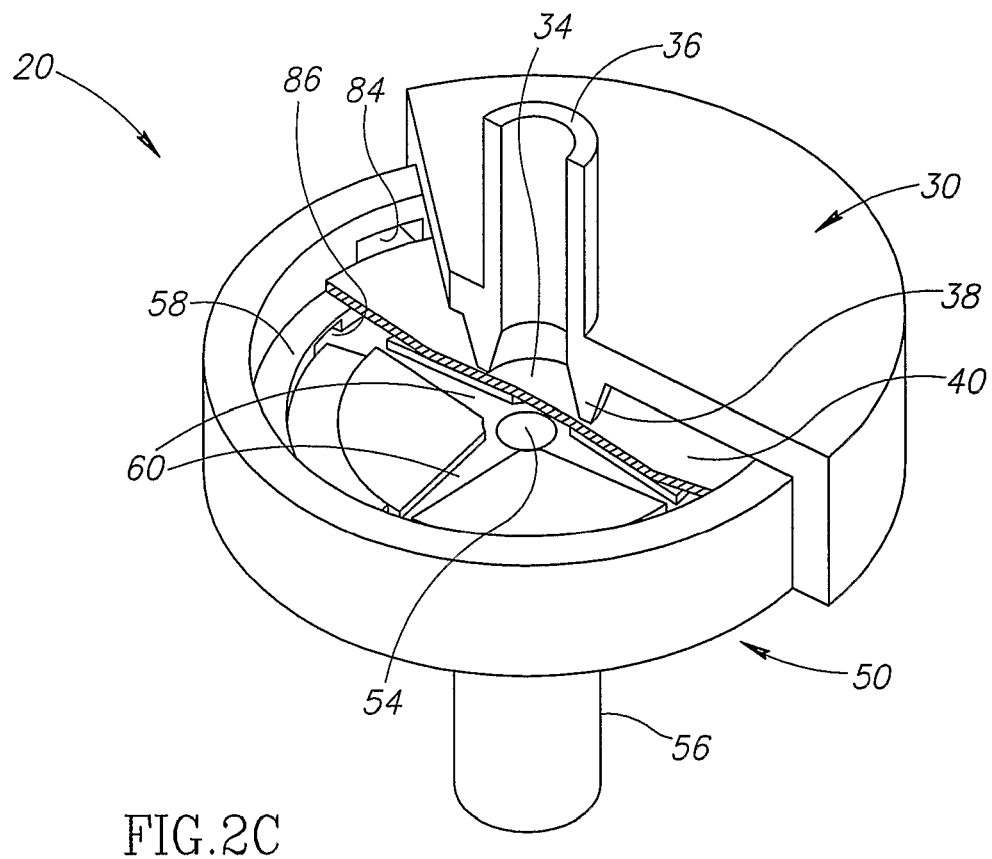
FIGS. 2C and 2D respectively show schematic perspective and cross-sectional cutaway views of the regulator shown in FIGS. 2A and 2B that illustrate distortion of a diaphragm in the regulator at a relatively high pressure, in accordance with an embodiment of the invention.
Figure 2D:
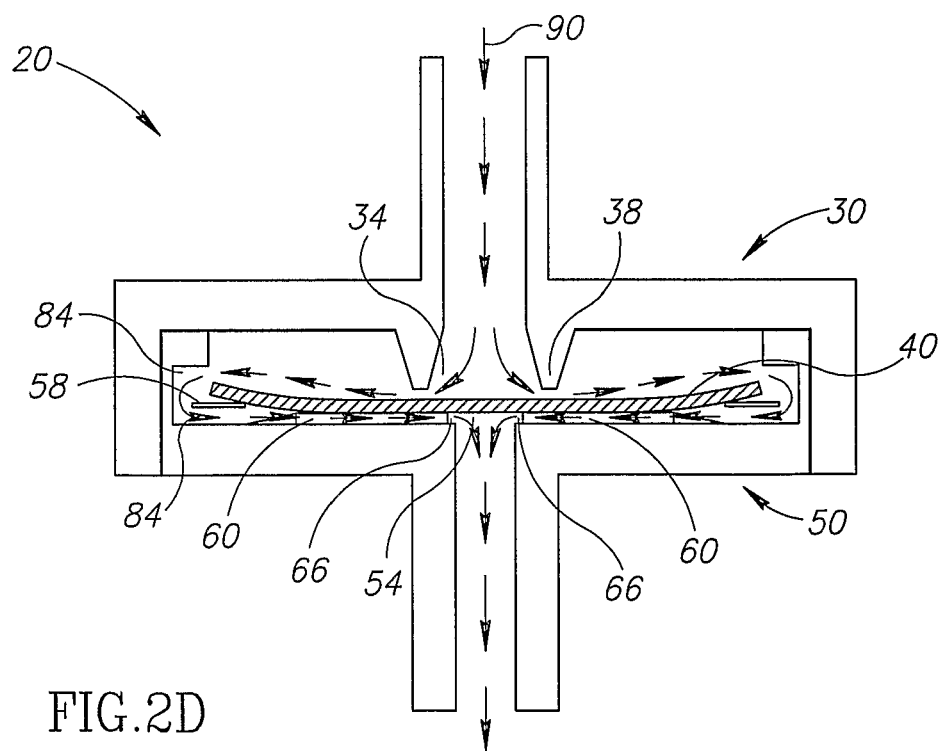

FIGS. 2A and 2B show schematic perspective and cross-sectional cutaway views respectively of the regulator 20 that schematically illustrate distortion of diaphragm 40 in the regulator at a relatively low pressure, in accordance with an embodiment of the invention. Flow of water entering and exiting regulator 20 is schematically indicated by arrows 90. For comparison FIGS. 2C and 2D show schematic perspective and cross-sectional cutaway views respectively of the regulator 20 that schematically illustrate distortion of diaphragm 40 in the regulator at a relatively high pressure, in accordance with an embodiment of the invention. The figures schematically illustrate the increased distortion of diaphragm 40 and resulting greater cover lengths at the higher inlet pressure. At the relatively low pressure shown in FIG. 2A, diaphragm 40 is moderately distorted and covers a moderate portion of at least one channel 60. At the relatively high inlet pressure cover length of channel 60 is substantially increased. For convenience of presentation, diaphragm 40 is cut away along a line that follows the edges of two flow channels 60.

However, distortion of fluid flow control diaphragm is in general not linear with increase in inlet pressure. Generally, rate of increase in distortion of diaphragm 40 and corresponding rate of increase in cover length slows as a function of increasing inlet pressure. Unless compensated for, the slowing rates would degrade the ability of regulator 20 to maintain a substantially constant regulated output flow of water as inlet pressure of the water changed.

Compensation, in accordance with an embodiment of the invention, is achieved by the narrowing of at least one channel 60 with increasing distance along the channel from junction 66 as discussed above. The narrowing results in a decrease in channel cross-section with increasing distance along the channel from junction 66 and concomitant greater rate of channel flow resistance with increasing cover length. The flow channel narrowing is optionally determined so that channel resistance to fluid flow is substantially proportional to inlet water pressure, as a result of which, regulator 20 provides a regulated output flow of fluid that is substantially independent of inlet pressure. In some embodiments of the invention, characteristics of diaphragm 40 and a pressure regime in which regulator 20 operates are such that decrease in rate of increase of cover length with inlet pressure is such that a linear decrease in channel width with channel distance can satisfactorily compensate for the cover length rate decrease. The inventor has found that for water inlet pressures between about 0.5 bar and about 6 bar, which are typically encountered in irrigation applications, a satisfactory linear decrease in channel width is generally obtained if sidewalls converge with channel distance at an angle between about 10° and about 50°.

For a given convergence angle of at least one flow control channel 60, a magnitude of regulated flow rate of water provided by regulator 20 is determined substantially by the depth of the channel. Increasing the channel depth increases the regulated output flow rate and decreasing the channel depth decreases the regulated output flow rate. Because the ability of regulator 20 to maintain a relatively constant output flow is determined substantially only by the narrowing of the channel width, for some ranges of channel depths and corresponding output flow rates, changing the channel depth does not substantially affect efficacy of regulation of output flow with inlet pressure. For these ranges, the channel configuration in accordance with an embodiment of the invention decouples the regulation function of regulator 20 from a magnitude of the regulated fluid and change in channel depth changes substantially only the magnitude of the output flow rate provided by the regulator.

By way of numerical example, a water flow regulator in accordance with an embodiment of the invention similar to regulator 20 optionally has two water flow control channels 60 of length about 3 mm, a channel width at junction 66 equal to about 1.5 mm and a sidewall convergence angle of about 30°. The regulator provides satisfactory flow rate regulation for the same 30° convergence angle for channel depths between a channel depth equal to 0.2 mm and 0.4 mm. At 0.2 mm channel depth, the regulator provides a regulated flow rate of about 20 l/h and at a channel depth of about 0.4 mm the regulator provides a flow rate of about 35 l/h. For channel depths intermediate 0.2 mm to 0.4 mm the regulator provides regulated flow rates intermediate 20 l/h and 35 l/h. For regulated flow rates greater than about 40 l/h the convergence angle is advantageously increased (so that the channel narrows more rapidly with channel distance) and for regulated flow rates less than 20 l/h, the convergence angle is advantageously decreased (the channel narrows more slowly). Optionally, for flow rates greater than 40 l/h the convergence angle is increased to about 35°.

As a result of the relatively simple way a regulator in accordance with an embodiment of the invention similar to regulator 20 may be modified to change its regulated output flow rate, an injection mold used to produce the regulator is readily modified to produce regulators having different regulated fluid rates. In particular outlet cowling 50 can readily be modified to change depth of at least one channel 60, often without having to take into consideration or compensate for how change in channel depth affects the regulator's ability to regulate water flow. For a channel depth change that would result in an unacceptable compromise in flow rate regulation, satisfactory flow rate regulation can generally be restored by changing the convergence angle of sidewalls 64 of at least one channel 60. It is noted that the relative ease with which the injection mold can be modified is further enhanced because, in accordance with an embodiment of the invention, bottom 62 of each of at least one channel 60 is planar and lies in a same plane parallel to the plane of support shelf 58 of diaphragm 40. The component of the injection mold that is used to form at least one flow channel 60 is relatively easily adjusted to provide regulators that have different channel depths and therefore different output flow rates.

Figure 3:
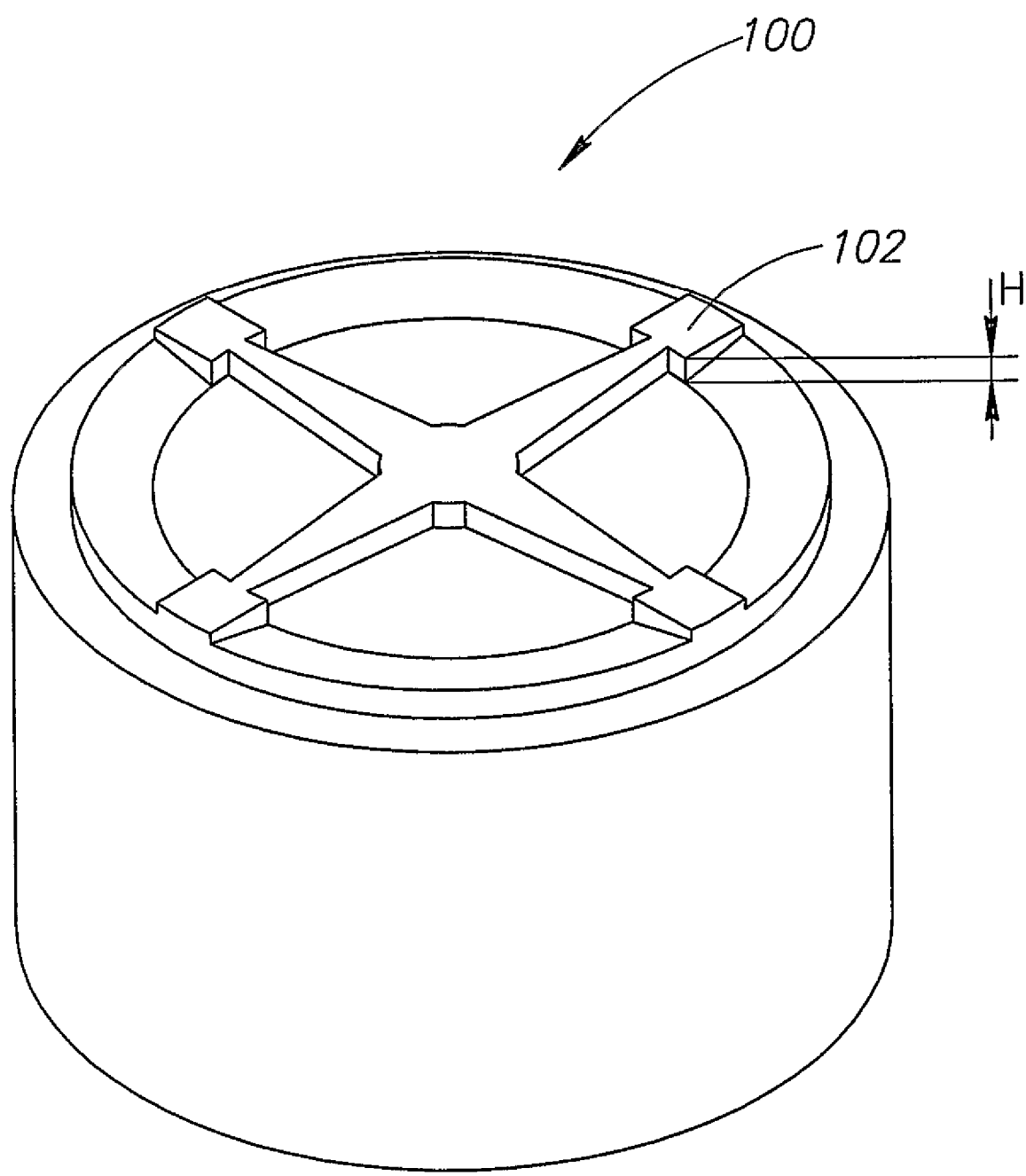
FIG. 3 shows a schematic of an insert of an injection mold used to produce flow channels in a regulator, in accordance with an embodiment of the present invention.

For example, FIG. 3 schematically shows an insert 100 of a mold used to produce at least one flow control channel 60 in outlet cowling 50. Insert 100 comprises a raised portion 102 that produces the at least one flow channel. Depth of at least one flow control channel 60 and corresponding magnitude of regulated fluid output flow provided by regulator 20 are determined by height "H" of raised portion 102. To adapt insert 100 to provide regulators that provide a lower fluid output flow, the insert is easily modified by machining off an appropriate layer of raised portion 102, for example on a milling machine. A factory for producing regulators in accordance with an embodiment of the invention similar to regular 20, might keep a stock of "virgin" inserts 100 having relatively high raised portions 102 and machine the raised portions to desired heights as required.

It is noted that whereas in regulator 20 all flow channels 60 are shown as identical in some embodiments of the invention a regulator is formed with flow channel having different shapes. For example, sidewall of different flow channels may converge with channel distance at different angles, different flow channels may have different depths and some flow channels may have sidewalls that do not converge. It is further noted that, in some embodiments of the invention channel sidewalls are not perpendicular the channel bottom. Generally, flow channels are easier to produce by injection molding if the channel side walls are angled with respect to the channel bottom at an angle greater than 90°.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A fluid flow regulator comprising:
a fluid inlet port and a fluid outlet port;
at least one open-faced flow control channel defined by a planar bottom and two sidewalls that communicates with the outlet port via a junction and has a cross-section that decreases with distance from the junction;
an elastic diaphragm;
a support shelf on which the diaphragm seats;
wherein to regulate fluid flow, with increasing inlet fluid pressure the diaphragm covers portions of the open face flow control channel that are farther from the junction in a region where the cross-section decreases with distance from the junction.

2. A fluid flow regulator according to claim 1 wherein the at least one open-faced flow control channel comprises a plurality of channels.

3. A fluid flow regulator according to claim 2 wherein the bottoms of at least two of the flow control channels are coplanar.

4. A fluid flow regulator according to claim 1 wherein the sidewalls converge toward each other with distance from the junction.

5. A fluid flow regulator according to claim 4 wherein the sidewalls converge with distance along the at least one flow channel with a constant convergence angle.

6. A fluid flow regulator according to claim 2 wherein the sidewalls of different flow control channels of the at least one flow control channel converge at different constant convergence angles.

7. A fluid flow regulator according to claim 2 wherein the sidewalls of different flow control channels of the at least one flow control channel converge at a same constant convergence angle.

8. A fluid flow regulator according to claim 1 wherein the sidewalls have a uniform height along the length of the at least one channel.

9. A fluid flow regulator according to claim 1 wherein the support shelf supports the diaphragm along a planar contour parallel to the bottom of each of the at least one channel.

10. A fluid flow regulator according to claim 1 comprising:
an inlet cowling comprising a first injection-molded integral unit, wherein the fluid inlet port is formed on the inlet cowling; and
an outlet cowling comprising a second injection-molded integral unit, wherein the fluid outlet port is formed on the outlet cowling.

11. A fluid flow regulator comprising:
an inlet cowling comprising an inlet port;
an outlet cowling joined to the inlet cowling to form an internal volume, the outlet cowling comprising:
an outlet port in communication with the inlet port; and
at least one open-faced flow control channel formed on the outlet cowling and comprising a bottom and sidewalls, the at least one open-faced flow control channel being in communication with the outlet port via a junction and having a cross-section that decreases with distance from said junction; and
a diaphragm positioned between the inlet and outlet cowlings, the diaphragm contacting a support shelf provided on at least one of the inlet cowling and the outlet cowling.

12. The fluid flow regulator according to claim 11, wherein:
the inlet cowling comprises a first injection-molded integral unit; and
the outlet cowling comprises a second injection-molded integral unit.

13. The fluid flow regulator according to claim 12, wherein:
the support shelf is formed on the outlet cowling;
the diaphragm is supported by the support shelf; and
the diaphragm divides the internal volume into an inlet chamber on one side of the diaphragm, and an outlet chamber on the other side of the diaphragm.

14. The fluid flow regulator according to claim 12, wherein:
the inlet cowling further comprises a diaphragm scaffold formed on an inside surface thereof, the diaphragm scaffold configured to maintain a position of the diaphragm.

15. The fluid flow regulator according to claim 12, wherein:
the at least one open-faced flow channel connects, at an end opposite to the junction, to a channel inlet formed in a sloped apron.

16. The fluid flow regulator according to claim 12, wherein:
the at least one open-faced flow control channel comprises a plurality of channels.

17. The fluid flow regulator according to claim 16, wherein:
the plurality of channels are configured symmetrically about the outlet port;
the bottom of each flow control channel is flat and lies in a plane that is parallel to a plane defined by the support shelf;
sidewalls of each flow control channel have a constant height and converge toward each other with distance from the junction.

18. The fluid flow regulator according to claim 16, wherein:
the plurality of channels are configured symmetrically about the outlet port.

19. The fluid flow regulator according to claim 16, wherein:
the bottom of each flow control channel is flat and lies in a plane that is parallel to a plane defined by the support shelf.

20. The fluid flow regulator according to claim 16, wherein:
sidewalls of each flow control channel have a constant height and converge toward each other with distance from the junction.

* * * * *